US012643681B2

(12) United States Patent
Ajilore

(10) Patent No.: US 12,643,681 B2
(45) Date of Patent: Jun. 2, 2026

(54) STORAGE UNIT FOR SPACECRAFT

(71) Applicant: David I.O Ajilore, Chantilly, VA (US)

(72) Inventor: David I.O Ajilore, Chantilly, VA (US)

( * ) Notice: Subject to any disclaimer, the term of this patent is extended or adjusted under 35 U.S.C. 154(b) by 459 days.

(21) Appl. No.: 17/693,556

(22) Filed: Mar. 14, 2022

(65) Prior Publication Data

US 2022/0340306 A1     Oct. 27, 2022

Related U.S. Application Data

(60) Provisional application No. 63/178,658, filed on Apr. 23, 2021.

(51) Int. Cl.
*B64G 1/10* (2006.01)
*B64G 1/42* (2006.01)
*B64G 1/66* (2006.01)
*B64G 1/22* (2006.01)

(52) U.S. Cl.
CPC .............. *B64G 1/10* (2013.01); *B64G 1/428* (2013.01); *B64G 1/66* (2013.01); *B64G 1/223* (2023.08)

(58) Field of Classification Search
CPC . B64G 1/10; B64G 1/428; B64G 1/66; B64G 1/223; B64G 1/22; B64D 9/00; A47F 5/0018; A47F 5/00; G05Q 50/28; H05K 7/00; H05K 7/14; H05K 7/18
USPC .......................................... 211/26, 26.2, 189
See application file for complete search history.

(56) References Cited

U.S. PATENT DOCUMENTS

| | | | | |
|---|---|---|---|---|
| 5,199,672 A | * | 4/1993 | King .................... | B64G 1/2427 |
| | | | | 244/164 |
| 5,848,766 A | * | 12/1998 | Thompson ............... | B64G 1/60 |
| | | | | 244/173.1 |
| 6,149,104 A | | 11/2000 | Soranno | |
| 6,267,253 B1 | * | 7/2001 | Jellicorse ................. | B64D 9/00 |
| | | | | 296/3 |
| 6,513,760 B1 | | 2/2003 | Mueller et al. | |
| 7,114,682 B1 | | 10/2006 | Kistler et al. | |
| 7,669,804 B2 | | 3/2010 | Strack et al. | |
| 10,435,156 B2 | * | 10/2019 | Bellof ...................... | B64D 9/00 |
| 2008/0078886 A1 | * | 4/2008 | Foster .................. | B64G 1/1078 |
| | | | | 244/173.1 |
| 2018/0040092 A1 | | 2/2018 | Valtanen | |

FOREIGN PATENT DOCUMENTS

WO          2019224282 A1     11/2019

* cited by examiner

*Primary Examiner* — Joshua D Huson
*Assistant Examiner* — Vicente Rodriguez

(57) ABSTRACT

A Magnetic Storage Unit (MSU) for on-board cargo/logistics storage in aspects of space exploration including spacecraft/space flights/launch vehicles and cargo/logistics on the International Space Station (ISS) and other space systems such as space station and spacecraft is provided in the present invention explanation. Further provides an integration of the Magnetic Storage Unit (MSU) including a power source for transferring power to a power wall and a Long Logistics Rod (LLR), the Long Logistics Rod (LLR) is linked to a control center for human interaction with each container secured with a holder.

10 Claims, 15 Drawing Sheets

STORAGE UNIT FOR SPACECRAFT

CROSS-REFERENCE TO RELATED APPLICATIONS

This application claims priority on U.S. Provisional Patent Application No. 63/178,658, entitled "A Storage Unit for Spacecraft", filed on Apr. 23, 2021, which is incorporated by reference herein in its entirety and for all purposes.

FIELD OF THE INVENTION

The present invention relates to a storage unit for spacecraft in aspects of space exploration. More particularly, the invention relates to a Magnetic Storage Unit (MSU) for storing and carrying a significant amount of on-board cargo.

BACKGROUND OF THE INVENTION

The storage and transportation of cargo in space and the maintenance of a suitable support platform are very expensive. The high cost creates a barrier for developing space storage and transportation platforms and limits the investment in technologically viable space ventures. Storage and transportation of cargo in space account for approximately one-half the cost of a typical space venture. So, more affordable cargo storage and transportation platforms may lead to increase commercialization in space explorations.

Generally, on the international space station (ISS), a considerable amount of cargo is stored within bags, these bags are then strapped down by belts, wires, or harnesses. Robustness will have to be replicated on all levels. Meaning from the space stations to the space vehicles and even the future outposts on the planetary bodies.

The spacecraft systems are designed to carry out the mission and are specifically designed to be compatible with storing and transporting the needed cargo. The cost of spacecraft and their missions is unavoidably tied to storing and transporting cargo in spacecraft. So, storing and carrying cargo in the spacecraft and its various components is of great concern.

The spacecraft and onboard cargo are high-value assets, and the risks to these are mitigated to the greatest degree possible by various logistical measures, which in turn, make the systems and procedures even more expensive. The result is that simplifications to storage and transportation of the cargo in the spacecraft and their missions can greatly affect their cost.

U.S. Pat. Nos. 6,267,253 and 7,114,682 disclose storing and transporting the cargo such as items required in a space mission, such as clothes, food, equipment, and tools in the spacecraft within special purpose stowage apparatus such as lockers or racks.

U.S. Pat. No. 7,669,804 discloses a spacecraft including specialized compartment configuration, where a multi-purpose logistics module (MPLM) is used for holding various cargo and other payloads for a typical mission.

U.S. Pat. No. 6,513,760 discloses a logistics module that includes a cylindrical outer wall defining an opening, a cargo container disposed at least partially within the cylindrical outer wall, and a cover that is movable between an open position and a closed position to provide access to the interior of the logistics module.

Although the spacecraft are specifically designed to be compatible with storing and transporting cargo in space, the available storage systems are relatively expensive and not user-friendly with the operations. In light of the foregoing discussion, the present invention aims at providing an improved storage unit in which a significant amount of on-board cargo is stored in the aspect of space exploration, and the storage unit is designed for rapid, easy, and safe adaptation for performing a wide variety of different space missions in a cost-conscious and user-friendly manner.

SUMMARY OF THE INVENTION

To solve the problems stated above, the present invention provides a Magnetic Storage Unit (MSU) for cargo/logistics storage in the aspect of space exploration, which includes spacecraft/space flights/launch vehicles and cargo/logistics on the International Space Station (ISS) and other space fairing vehicles.

Specifically, the present invention utilizes the Magnetic Storage Unit (MSU) for storing and transporting onboard cargo.

One aspect of the present invention provides an integration of the Magnetic Storage Unit (MSU), the integration includes an external power source for transferring electrical power to a power wall and a Long Logistics Rod (LLR), the Long Logistics Rod (LLR) is then linked to a control center for human interaction with each on-board Magnetic Storage Unit (MSU) that gives specific measurements and values for each storage unit. Further, a holder is configured for securing a container that holds cargo.

In one aspect of the present invention, the container is divided into two parts; a storage compartment and a lower container section which contains important electrical hardware that will ultimately mate/connect with the holder. The storage compartment is where all of the cargo is stored. The lower section is an upside-down trapezoid in shape with a smaller upside trapezoid within. The shape of the lower section is an important feature because if calculated correctly, geometrical equilateral triangles are formed at the outward edges of the lower section. The equilateral triangles are covered with a thin rubber layer (not shown), and further, a "Gain ring" and photon sensors are placed at the outermost side of the equilateral triangles for alignment between the lower section of the container to the holder.

Further in one aspect of the present invention, the smaller upside trapezoid provides a locking mechanism that plays an important role in securing the container to the holder. Further, the locking mechanism plays an important role in securing the container to the holder while also transferring the needed current to the batteries for recharging. Important note: The geometrical consideration can change depending on the configuration of the spacecraft.

The holder is divided into three plates and also includes a laser assembly. The laser assembly with sub-components forms right triangles. The right triangle contains servo linear actuators for vertical and horizontal movement, which will work to fit different sizes of the container.

In another aspect of the present invention, the Long Logistics Rod (LLR) is a duct filled with harnesses with an opening for electrical integration with the holder, this opening is an adapter. The adapter connects to the bottom of the holder. The Long Logistics Rod (LLR) further contains harnesses for connecting to external power buses that will supply needed energy to the control center and other subsystems. The control center optimizes the needed power for the operation to save power and store power within the batteries. The control center also takes information from the microprocessors. The adapter includes an insulation cap that is used to insulate the current flowing from the harness to the holder for additional safety.

Another aspect of the present invention provides a locking mechanism using the locking system. The locking system includes four different components, a microprocessor/relay, which is configured with a battery, injectors/actuators, an armature, and bottom lockers/current transfer unit. The microprocessor is a four-point system, which is relatively small that receives current from an external power source during the alignment stage. When in full alignment, an onboard microprocessor/relay detects the information from the photon sensor which will initiate the bottom lockers injectors/actuator for locking and current transfer for charging the battery. A Locker connection point secures the container to the holder and also transfers currents from the Long Logistics Rod (LLR) through the holder to the container which also contains a battery pack. Further inside the bottom locker a cylindrical casing which comprises two layers, an inner layer and an outer layer, connected to forms a "yoke" at the front of injectors/actuators which will connect to the armature. The actuators will push and pull the injectors in the alignment process. Then, the current transfer unit will activate once the container is aligned to the holder, thus locking the system and transferring the current to the battery. Once the container and the holder have fully connected/mated, the system will thus cut off electrical current running through the holder and the container, unless the battery packs need to be charged.

The summary of the invention is not intended to limit the key features and essential technical features of the claimed invention and is not intended to limit the scope of protection of the claimed embodiments.

BRIEF DESCRIPTION OF THE DRAWINGS

The object of the invention may be understood in more detail and a particular description of the invention is briefly summarized above by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DETAILED DESCRIPTION OF THE INVENTION

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of the ordinary skills in the art to which this invention belongs. The terminology used in the description of the invention herein is for describing particular embodiments only and is not intended to be limiting of the invention. As used in the description of the invention and the appended claims, the singular forms "a", "an" and "the" are intended to include the plural forms as well, unless the context clearly indicates otherwise.

As described herein with several embodiments, the present invention provides a Magnetic Storage Unit (MSU) for cargo/logistics storage for spacecraft/space flights/launch vehicles/space shuttles and cargo/logistics on the International Space Station (ISS) and in aspects of the space exploration. The Magnetic Storage Unit (MSU) provides storing on-board cargo such as items required in a space mission, such as clothes, food, equipment, and tools. Although with dimensional calculations of alternative auxiliary spaces, multiple smaller Magnetic Storage Units (MSU) can be stored in the module.

Figure 1:
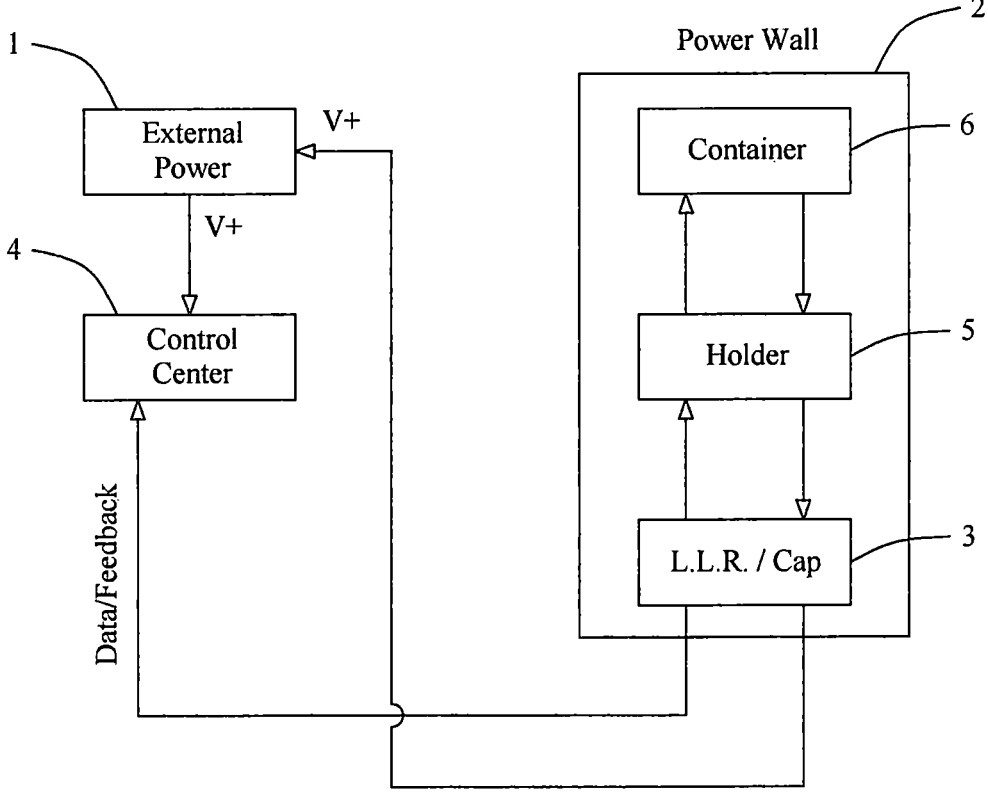
FIG. 1 is a block diagram showing an integration of a Magnetic Storage Unit (MSU) to a space system in accordance with the present invention.

Referring now to FIG. 1 is an integration of the Magnetic Storage Unit (MSU) in accordance to embodiments of the present invention including an external power source 1 for transferring power to a power wall 2, the power wall 2 consists of the different subsystems such as the Long Logistics Rod (LLR) 3, Holder 5, and Container 6. The Long Logistics Rod (LLR) 3 is linked to a Control Center 4 for Human (Astronaut) interaction with each on-board Magnetic Storage Unit (MSU) that gives specific measurements and values for each storage unit. The holder 5 is for securing the container 6, the container 6 holds the cargo such as clothes, food, equipment, scientific equipment, tools. The holder 5 also carries an onboard battery pack for stored power, thus relieving pressure off the main power unit.

Electrical current from the external power source 1 is transferred to the Long Logistics Rod (LLR) 3 through the holder 5 to a battery pack in the container 6, thus again relieving the pressure of the entire power unit.

The Magnetic Storage Unit (MSU) further comprises a locking system, the locking system is aligned with the container 6, and then latches and secures the container.

Figure 2:
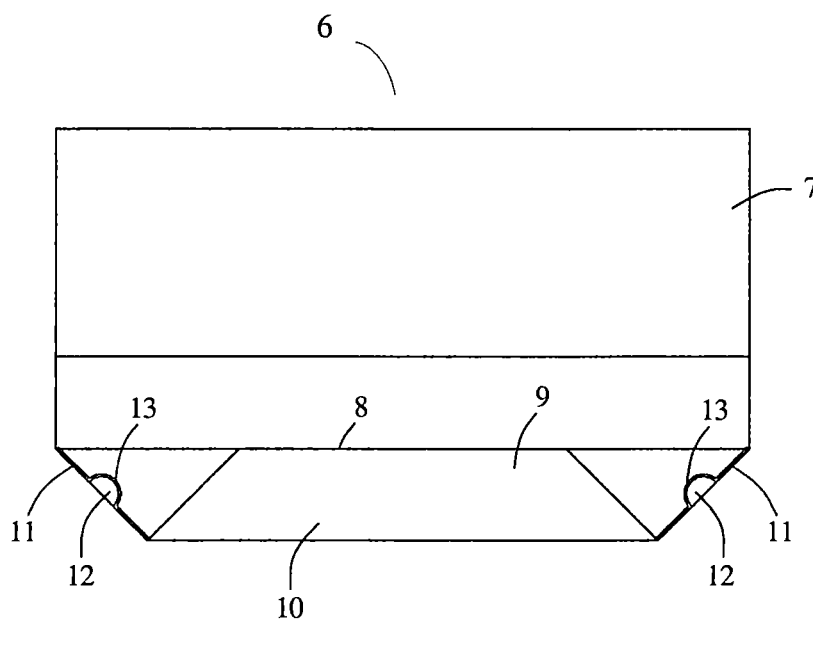
FIG. 2 is a front view of a container for storing cargo/logistics in accordance with the present invention.

One embodiment of the present invention as shown in FIG. 2 is the container 6, the container is divided into two parts; a storage compartment 7 and a lower section 8 which contains important hardware that will ultimately connect/mate with the holder 5. The storage compartment 7 is where onboard cargo is stored. The lower section 8 is an upside-down trapezoid 9 in shape with a smaller upside trapezoid 10 within. The shape of lower section 8 is an important feature because if calculated correctly, geometrical equilateral triangles 11 are formed at the outward edges of the lower section 8. The equilateral triangles 11 are covered with a thin rubber layer (not shown), and further a "Gain ring" 12 and photon sensors 13 are placed at the outermost side of the equilateral triangles 11 for alignment between the lower section 8 of the container 6 with the holder 5. The smaller upside trapezoid 10 provides a locking mechanism/locking system that plays an important role in securing the container 6 to the holder 5.

Figure 3:
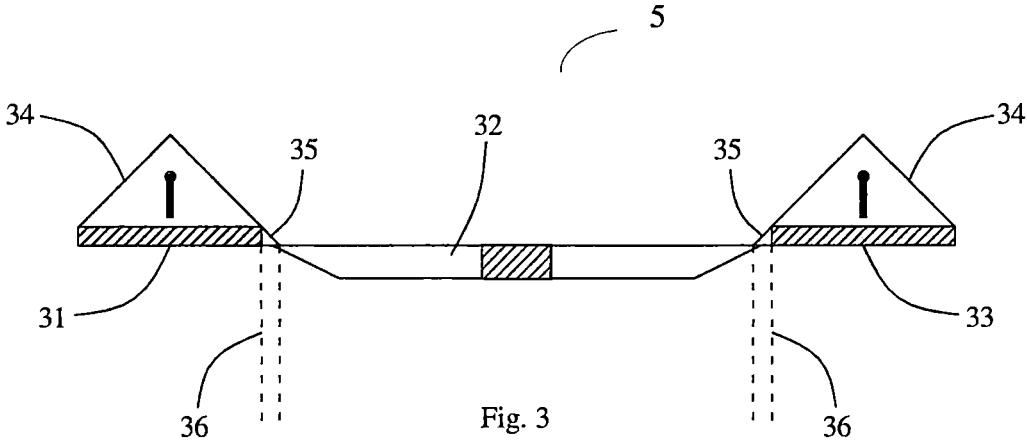
FIG. 3 shows a holder in accordance with the present invention.

As shown in FIG. 3 is the design configuration of the holder 5, the holder 5 is divided into three plates 31, 32, and 33 and also includes a laser assembly 34. The laser assembly 34 with sub-components forms right triangles 35. As it can be seen in FIG. 3, the right triangles 35 connect the plates 31 and 33 to the plate 32 and also provides a connection 36 to Long Logistics Rod (LLR) 3 that connects the holder 5 to the Long Logistics Rod (LLR) 3. In some embodiments, the inner section of the plates 31 and 33 will be lined with copper or similar materials. The right triangles 35 contains servo linear actuators for vertical and horizontal movement, which will work to fit different sizes of the container 6, without limiting the scopes of the invention.

Figure 4A:
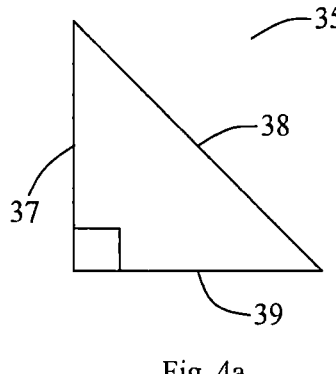
FIG. 4*a* shows the vertical and horizontal expansion of the holder, in accordance with the present invention.
Figure 4B:
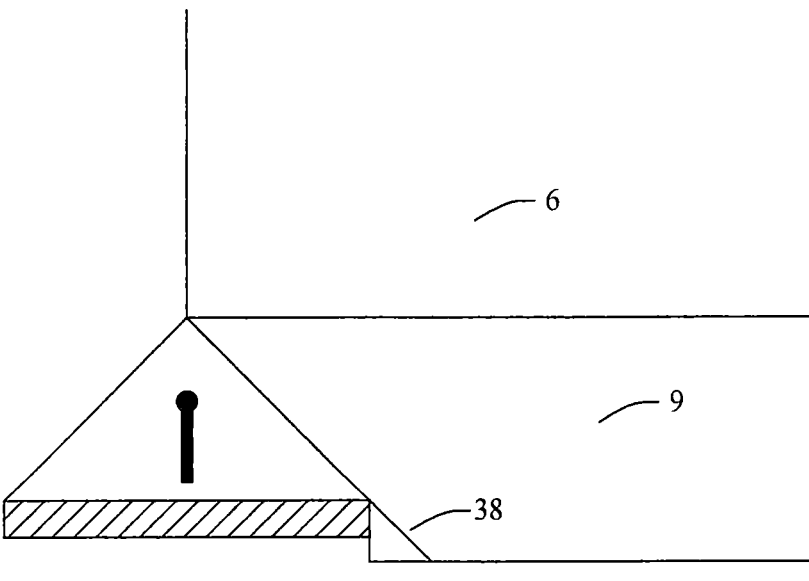
FIG. 4*b* shows a view for the holder securing the container, in accordance with the present invention.
Figure 4C:
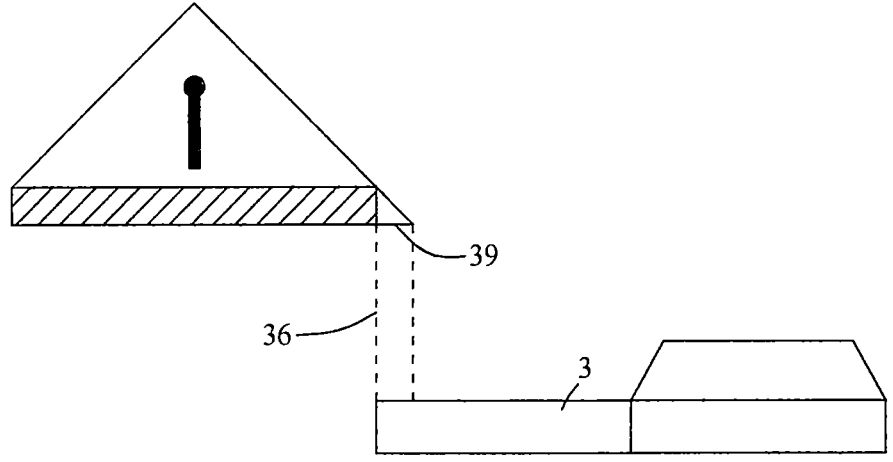
FIG. 4*c* shows the holder connecting to a Long Logistics Rod (LLR), in accordance with the present invention.

As shown in FIG. 4*a*, three different sides 37, 38, and 39 of the right triangles 35, where a side 37 provides vertical and horizontal expansion of the holder 5, a side 38 is where the container 6 meets with the holder 5, and a side 39 is a leg connecting to the Long Logistics Rod (LLR) 3. In the embodiments of the invention, the vertical and horizontal expansion is a push/pull down mechanism which will increase the area of the holder 5 for added container 6 sizes. FIG. 4*b* shows the securement of the container 6 to the holder 5, where the lower section 8 of the container 6 meets at the side 38 of the right triangle 35 with the upside-down trapezoid 9. FIG. 4*c* shows the holder 5 connecting to a Long Logistics Rod (LLR) 3 at the side 39 of the right triangle 35 with the connection 36.

Figure 5A:
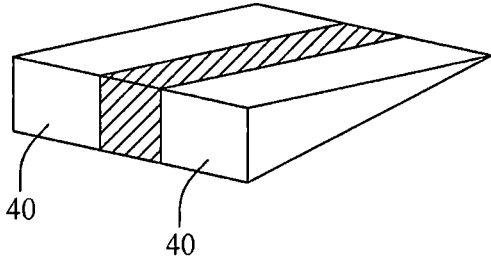
FIG. 5*a* shows a Right triangle connection with the sub-components that houses actuators for vertical and horizontal compression and expansion of the holder for holding and securing different sizes of containers, in accordance with the present invention.
Figure 5B:
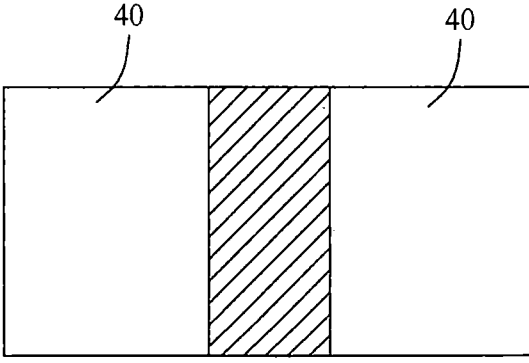
FIG. 5*b* is a front view of the Right triangle connection with the sub-components, in accordance with the present invention

FIG. 5*a* and FIG. 5*b* show the right triangle 35 on the plates 31 and 33. An inner section of the plates 31 and 33 are lined with copper in some areas. This gives the plates 31 and 33 modular connections to the plate 32. There is a space 40 within the plates 31, 32, and 33, which provides vertical and horizontal expansion. The space 40 includes salvos or linear actuators, anything that is needed within to expand the container 6 of different sizes, without limiting the scopes of the invention.

Figure 6:
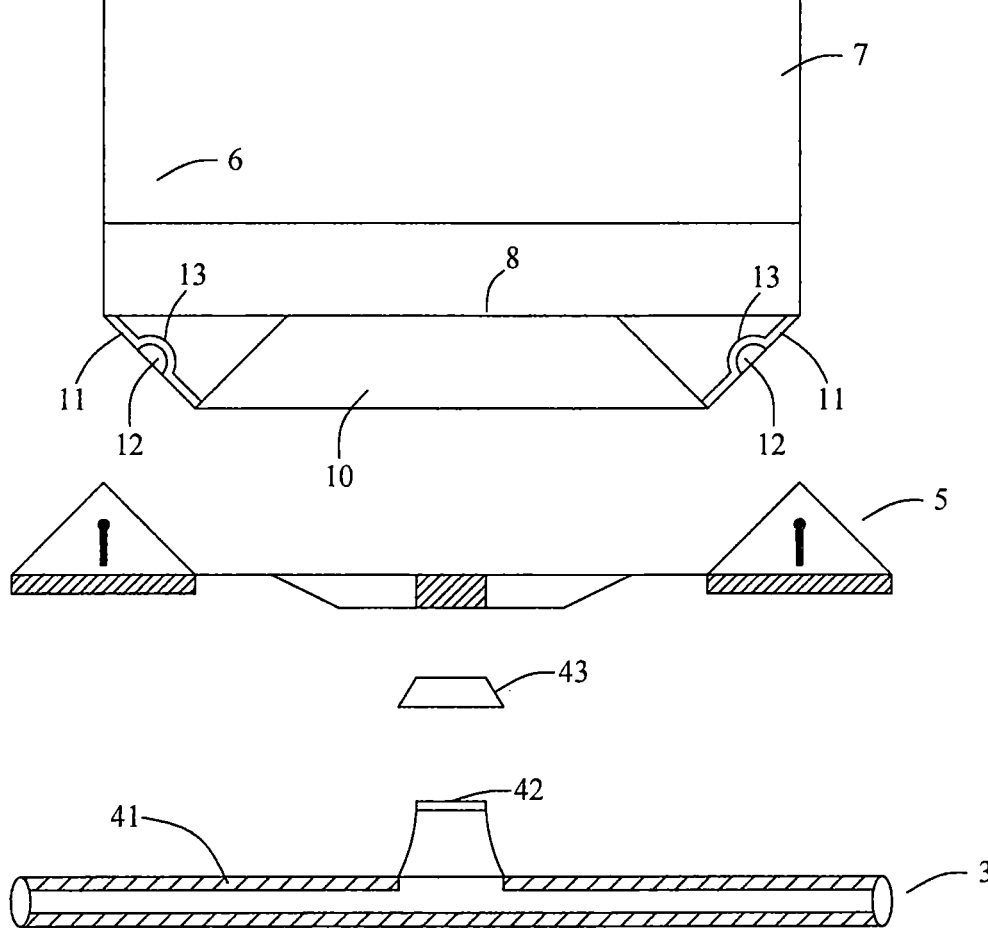
FIG. 6 shows securing arrangement of a container with an upper and lower section, the Long Logistics Rod (LLR) with the holder, in accordance with the present invention.

FIG. 6 shows a locking mechanism of the container 6 and the Long Logistics Rod (LLR) 3 with the holder 5. As shown in FIG. 6, the lower section 8 of the container 6 may be connected to the mid-section of the holder 5, i.e. on the plate 32 of the holder 5. Further, the holder 5 connects to the Long Logistics Rod (LLR) 3. The Lower section 8 of the container 6 includes a locking system, which is described later in the document. As described above, the equilateral triangles 11 on the lower section 8 of the container 6 are covered with a thin rubber layer, and the gain ring 12 and photon sensors 13 are placed at the outermost side of the triangles 11 for alignment between the lower section 8 of the container 6 to the holder 5. The smaller upside trapezoid 10 provides a locking system that plays an important role in securing the container 6.

The Long Logistics Rod (LLR) 3 is a duct 41 with an opening for electrical integration with the holder 5, this opening is an adaptor 42. The adaptor 42 will connect to the bottom of the holder 5. The Long Logistics Rod (LLR) 3 further contains a harness for connecting to external power busses that will supply needed energy to the control center 4 and other subsystems. Using data/feedback from MSU's periodical operation, the control center 4 will optimize the needed power for operation to save power. The adaptor 42 includes an insulation cap 43 that is used to insulate the current flowing from the harness to the holder 5 for safety purposes.

Further, the Long Logistics Rod (LLR) 3 includes the insulation cap 43 on the adaptor 42 for insulation of current going through the Long Logistics Rod (LLR) 3. The plug-in point of the Long Logistics Rod (LLR) 3 will send current to the holder 5 which will need insulation. The insulation cap 43 can also be used as a connection point to give the system standing. Once the insulation cap 43 connects and the container 6 is aligned with the holder 5, currents flow horizontally being pushed by voltages. Further, bolts (not shown) will connect both the insulation cap 43 and the Long Logistics Rod (LLR) 3. The Long Logistics Rod (LLR) 3 is made of carbon fiber because of its minimal conductivity. The Long Logistics Rod (LLR) 3 uses one or more harnesses to transfer specific power ratings to the holder 5. In some embodiments, the conductor going through the Long Logistics Rod (LLR) 3 will need to be configured in certain ways i.e. the harness will need to be put on one side of the inner Long Logistics Rod (LLR) 3.

Figure 7:
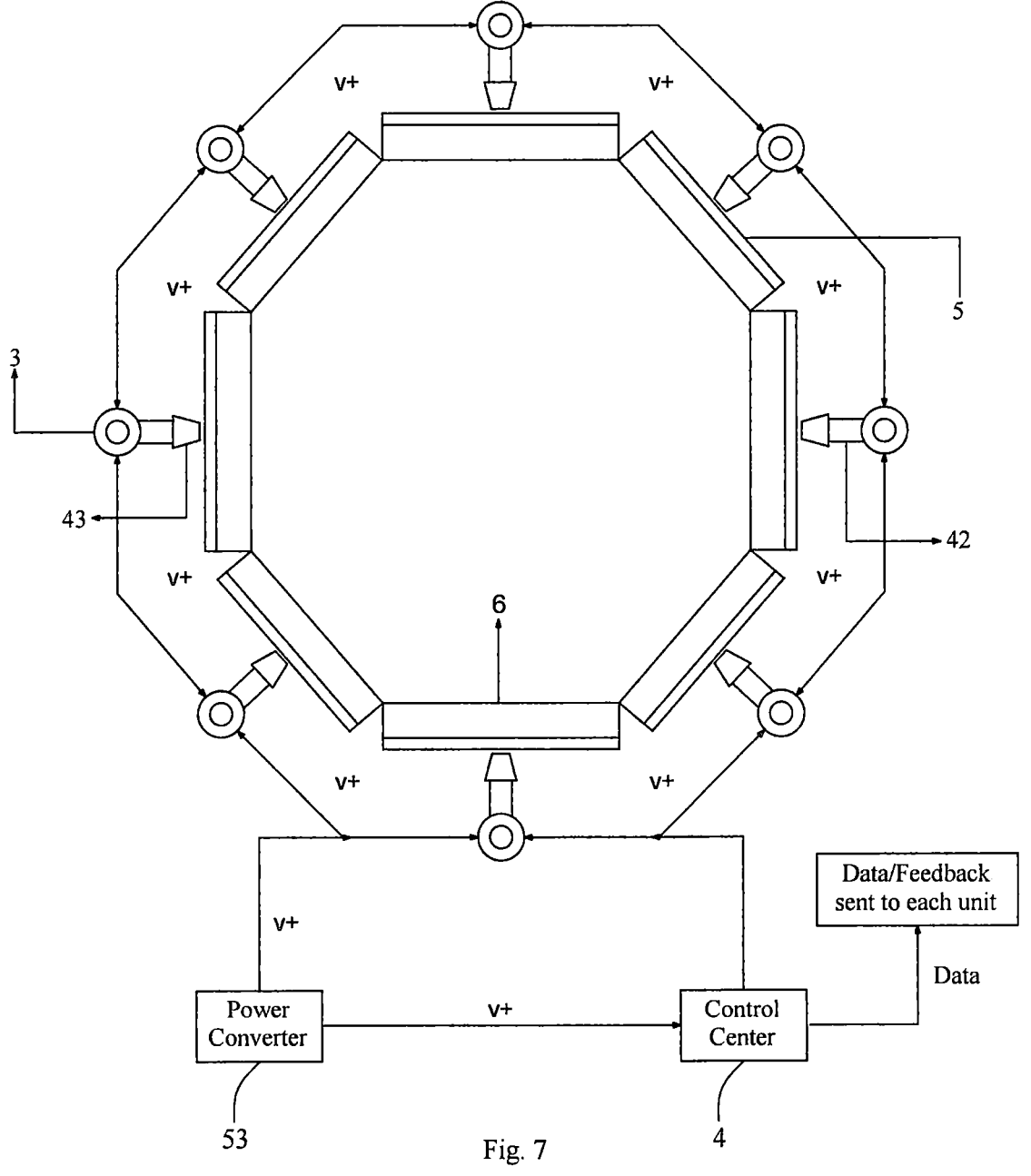
FIG. 7 shows a view of a connection between the container, the holder, the power wall, and the Long Logistics Rod (LLR), within a spacecraft or space station, in accordance with the present invention.

FIG. 7 shows an illustration of the connection between the container 6, the holder 5, the power wall 2, and the Long Logistics Rod (LLR) 3 according to an embodiment of the present invention. As shown in FIG. 7, each container 6 is connected to a holder 5. As shown in FIG. 7, one Long Logistics Rod (LLR) 3 with an adaptor 42 is connected to the bottom of each holder 5. As shown in FIG. 7, current travels through a power converter 53 and flows in the overall system. Current flows through the Long Logistics Rod (LLR) 3 through the Adaptor 42 which is covered by the insulation cap 43 for safety purposes. Further, the current then flows through the holder battery unit 66 and the bottom lockers 63. Current flowing through the bottom lockers will then flow into the container 6 current transfer unit and be stored within the container battery unit 70, which is described in FIG. 12 in detail.

Figure 8:
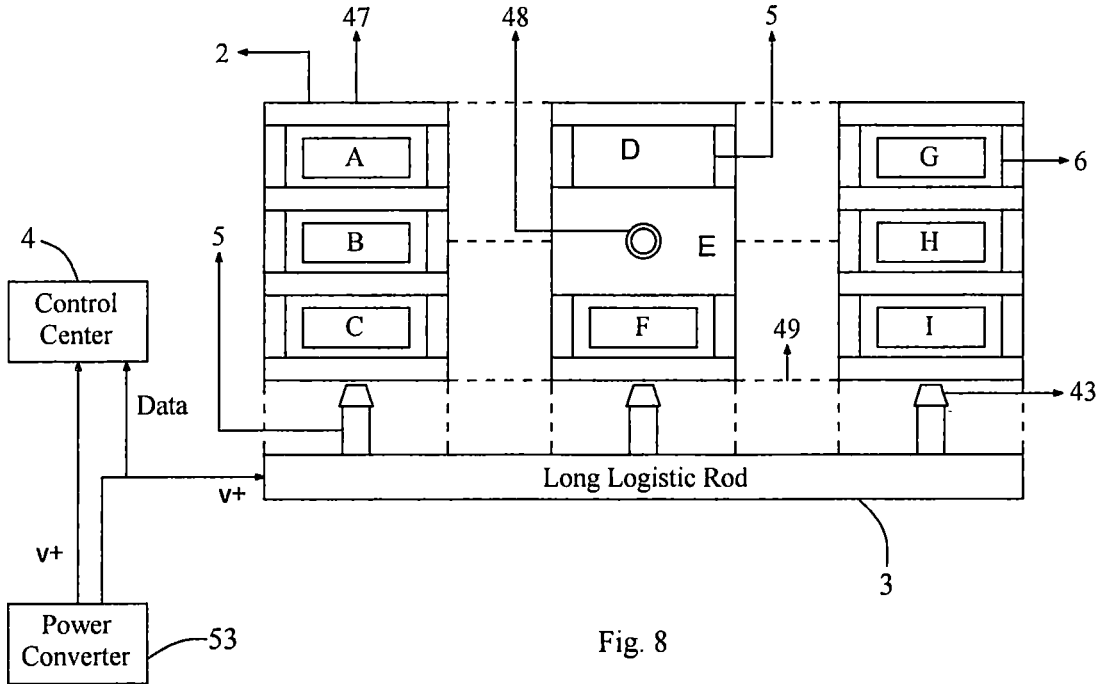
FIG. 8 shows an example of full stack configuration, in accordance with the present invention.

FIG. 8 illustrates the full stack 47 configurations of the container 6 and the holder 5 with the Long Logistics Rod (LLR) 3 in detail according to the embodiments of the present invention. As shown in FIG. 8, a plethora of containers 6 and holders 5 are placed in a power wall 2 and are secured in a stack configuration having multiple sections. Though FIG. 8 illustrates some sections, but many other additional sections can be possible without departing from the scope of the invention. Further, it is important to note that the connection between holder 5 and the container 6 for each section is represented as A, B, C, D, E, F, G, H, and I, whereas the connection can be changed depending on the dimensions of the space modules or spacecraft. As it can be seen in FIG. 8, at "D" the configuration only has a holder 5 in place. At "E", the configuration doesn't have a holder 5 or container 6, whereas an adapter plug-in 48 is shown. The Long Logistics Rod (LLR) 3 comprises a plethora of adaptors 42 connected to the power wall 2. Further, it can be seen that there is a gap 49 in between the stacks. According to the embodiments of the invention, the power from the external power source 1 is transferred to the Long Logistics Rod (LLR) 3 using a power converter 53.

Figure 9:
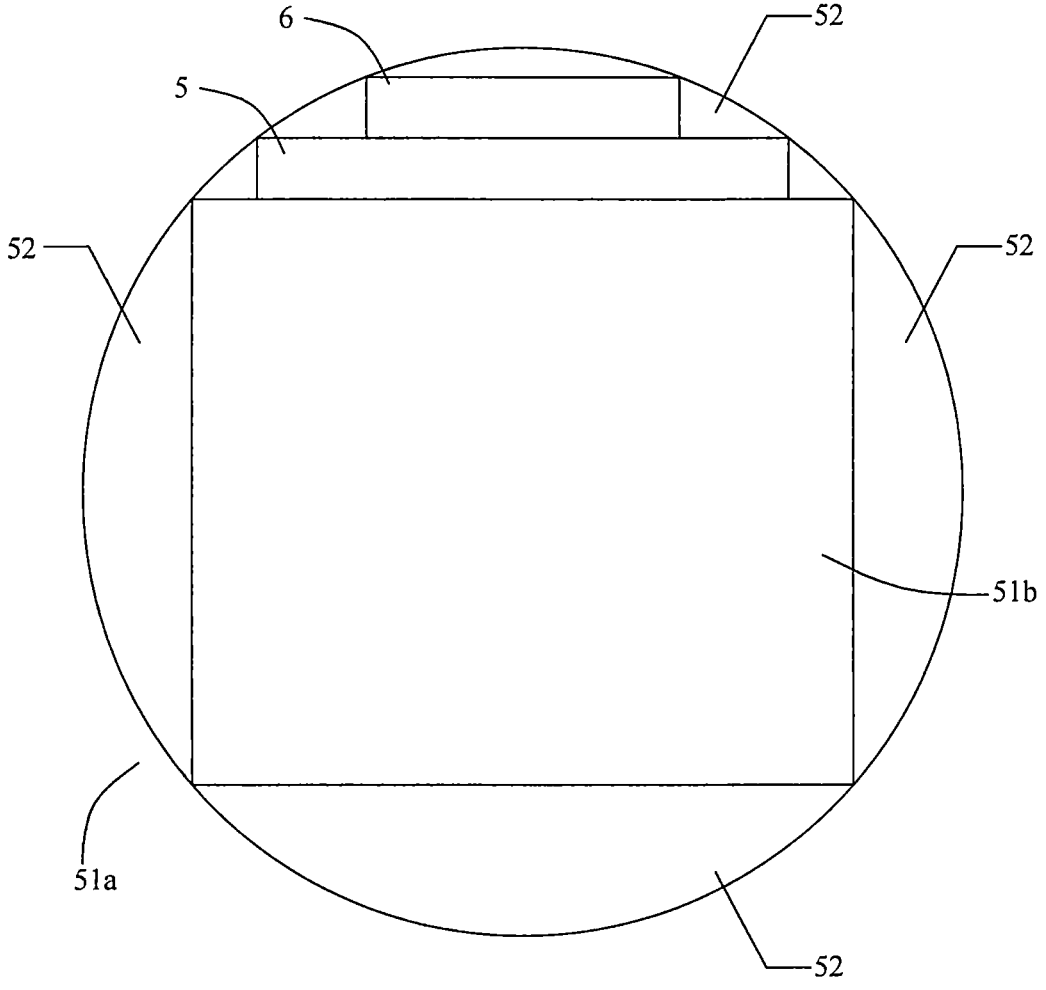
FIG. 9 is a block diagram of a Magnetic Storage Unit (MSU) integration with a spacecraft or space station module, in accordance with the present invention.

In one exemplary embodiment, FIG. 9 illustrates how the Magnetic Storage Unit (MSU) fits in the International Space Station (ISS), more importantly in a Multi-Purpose Logistics Module (MPLM) for storing cargo. As shown in FIG. 9, a circle 51a shown is an outline of a cylindrical space module, which as of now is the standard design for modules. The inner square 51b is the configuration of the power wall 2. The power wall 2 has four vertices 52 shown in FIG. 9, without limiting the scopes of the invention. According to the embodiments of the invention, the power walls 2 play a pivotal role in current transfer as well as data/feedback. The Long Logistics Rod (LLR) 3 is built into the power wall 2 to ease manufacturing that is being stated from the Long Logistics Rod (LLR) 3 and data/feedback mechanisms will flow through the power wall 2.

Further racks are embedded in the power wall 2 or connected to the power wall 2 and vice versa. The racks are avionic racks configured to include different subsystems such as the Long Logistics Rod (LLR) 3, the holder 5, and the container 6. The avionics rack includes an interactive human interface in which data from the various subsystems can be interpreted and adjusted for peak operation and power consumption, this can be achieved using the control center 4.

Figure 10:
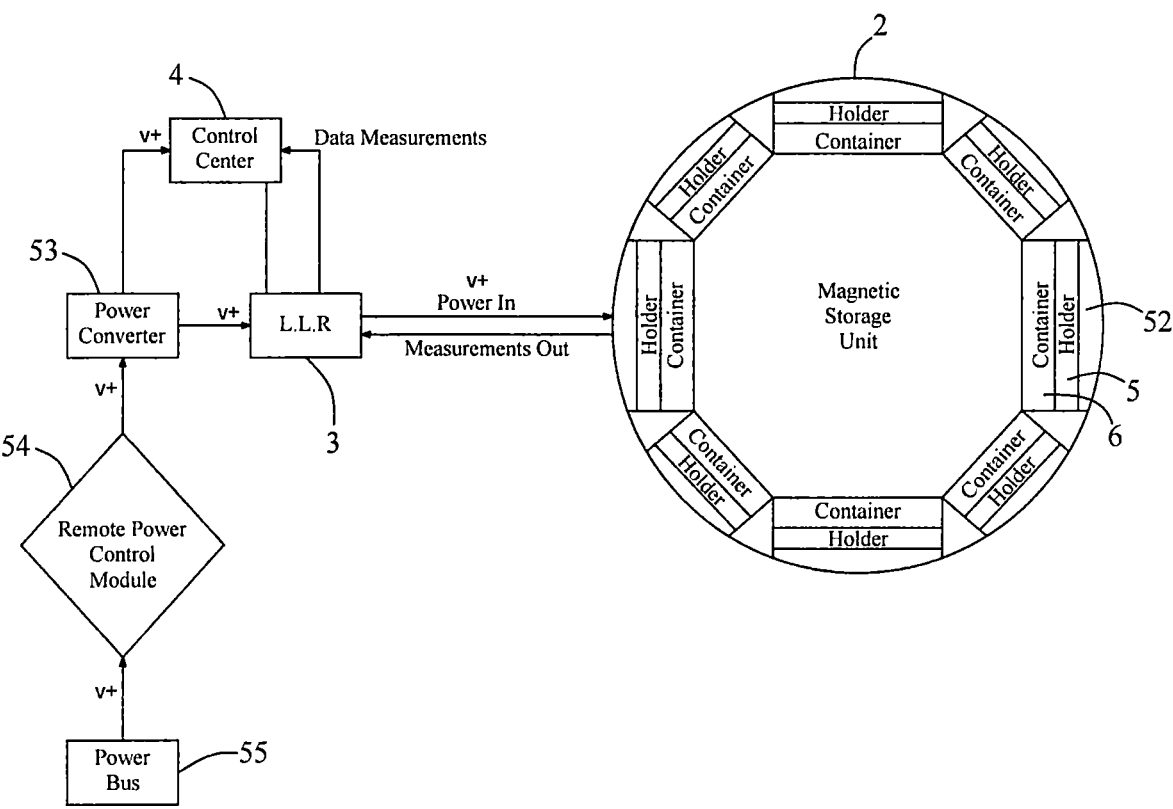
FIG. 10 shows an integration of the magnetic storage units (MSUs) in octagonal configuration within a spacecraft or space station module, in accordance with the present invention.

FIG. 10 shows for integration of the magnetic storage units (MSUs) in an octagonal configuration according to one embodiment of the present invention, having eight vertices 52, the vertices 52 are configured to include various subsystems such as the holder 5, and the container 6, and further the power wall 2 is connected to the Long Logistics Rod (LLR) 3. The Long Logistics Rod (LLR) 3 is linked to a control center 4 for human interaction with each onboard Magnetic Storage Unit (MSU) that gives specific measurements and values for each storage unit. The avionics rack includes an interactive human interface in which data from the various subsystems can be interpreted and adjusted for peak operation and power consumption, this can be achieved using the control center 4. Further, the electrical current from the external power source 1 is transferred to the Long Logistics Rod (LLR) 3 using a power converter 53 that includes remote power converter modules 54 connected to a power bus 55 on the external power source 1. By increasing the vertices 52 from four to eight, the system unit capacity increases by a factor of two. According to this embodiment, the invention provides the astronauts with more storage capacity and makes the system more robust. Meaning that the container's 6 sizes can vary depending on the space mission.

Figure 11:
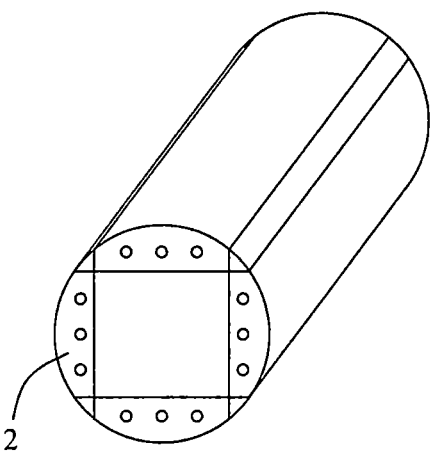
FIG. 11 is a power wall, in accordance with the present invention.
Figure 11A:
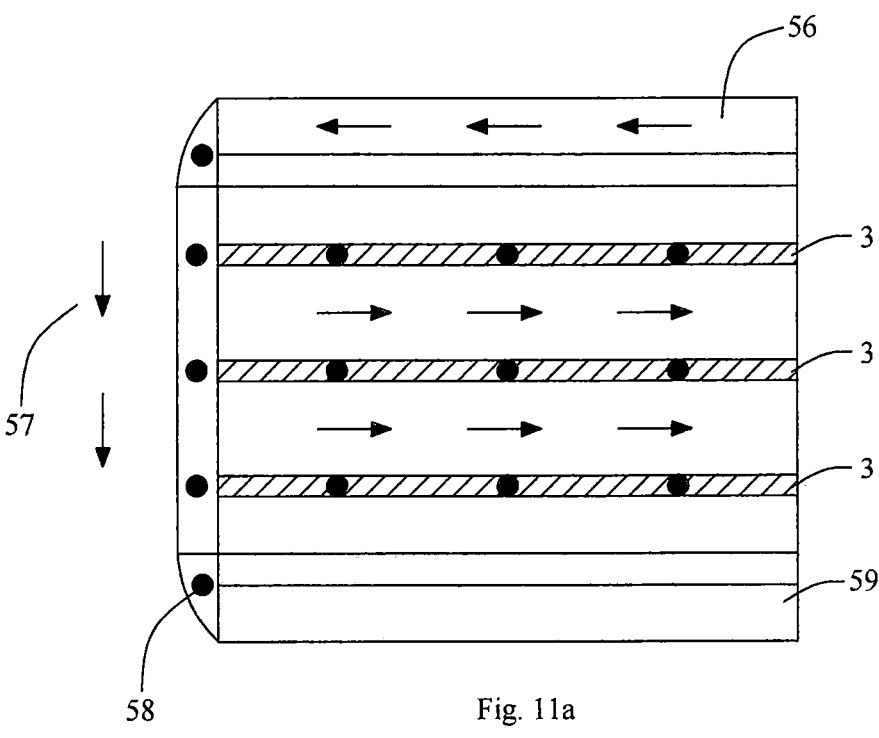
FIG. 11*a* is a cross-sectional view of a space module configuration with the power wall, in accordance with the present invention.

As shown in FIG. 11 is the power wall 2 and FIG. 11a is the cross-sectional front view of the Power wall 2 showing a current path 56 for the power wall 2 and current following 57 through the Long Logistics Rod (LLR) 3. Further shows the harness connecting side 58. So as described herein, the Power wall 2 is a way to transfer power using the Long Logistics Rod (LLR) 3 and through the Long Logistics Rod (LLR) 3 comes out 59 at the opposite side of the current entry as measurements. Measurements will go through the control center 4. The power wall 2 is configured to fit with a permanent logistics module or PLM. The dimension of the power wall 2 depends on the dimensions of the logistics module. Flexibility will be a mainstay with the overall system. Main staying meaning the exact dimensions of the power wall 2 will entail the measurements of the holder 5, matching both the power wall 2 and the holder 5 to the permanent logistics module.

Figure 12:
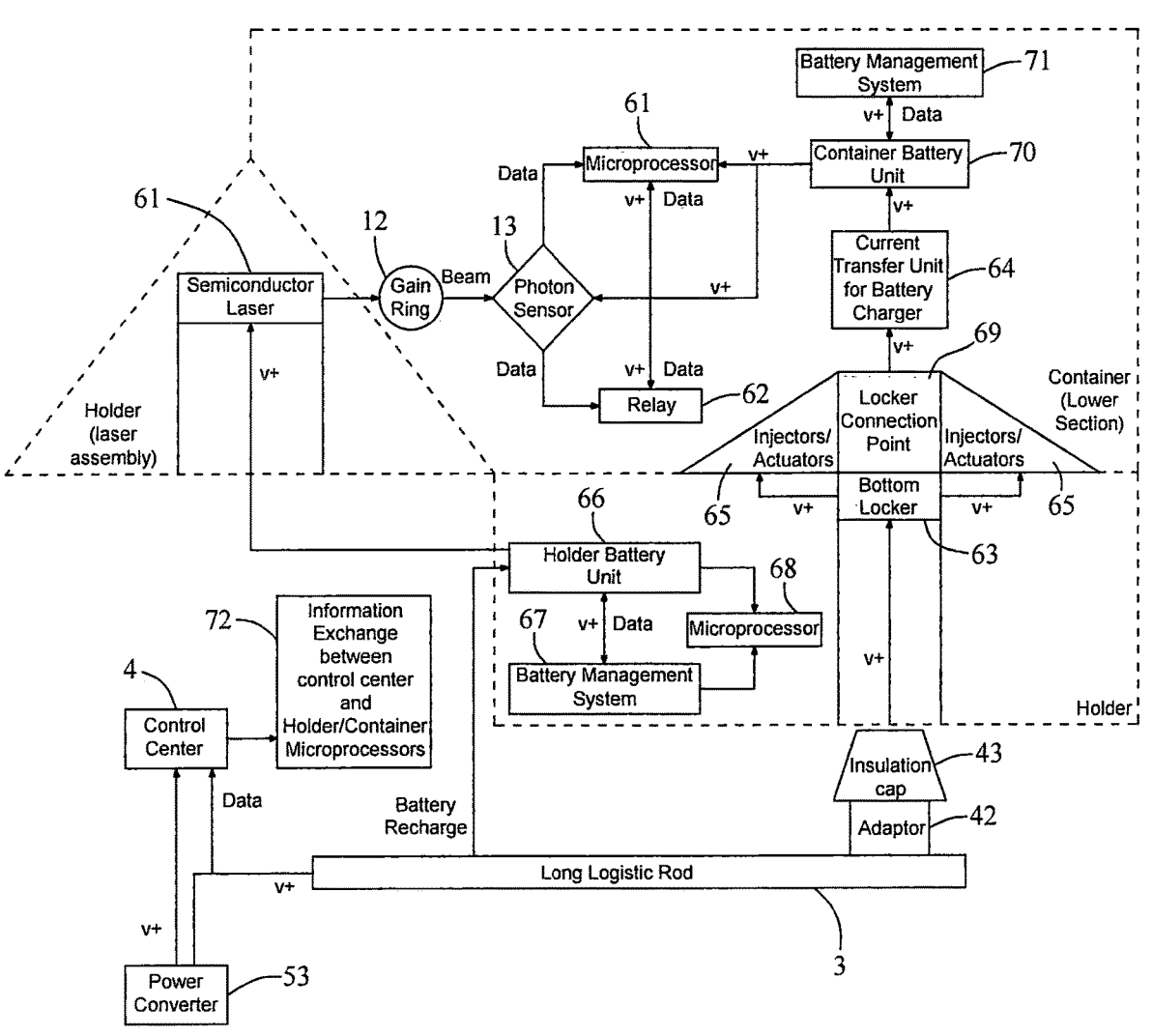
FIG. 12 illustrates a simplified view of the inner workings of the container and holder, an alignment process and a locking process, in accordance with the present invention.

As discussed above, the lower container section 8 of the container 6 includes a locking system in FIG. 6. The details of the locking system or locking process are shown in FIG. 12, which is described herein with further references to FIG. 1, FIG. 2, and FIG. 6. As discussed above, the holder 5 includes the laser assembly 34 having a semiconductor laser 61 that illuminates a coherent light beam shot to the gain ring 12 and photon sensor 13 of the outer layer of the lower container section 8. As it can be seen in FIG. 2, the gain ring 12 has a small opening, so once the coherent light beam is shot through the gain ring 12, the photon sensor 13 will send the readings to a microprocessor 61. In an alternative embodiment, the photon sensor 13 will send the readings to the microprocessor 61 and additionally to a relay 62. A coherent light beam is one where a sine wave has a stable phase shift, amplitude, and period. Once these readings are read by the microprocessor 61, the control center 4 will receive the readings and finish the alignment process. Once the alignment process is finished, the locking process begins. Now, moving on back to the holder 5, the bottom locker 63 will move vertically up to the locker connection point 69. Once the bottom locker 63 is in position, the injectors/actuators 65 will lock the bottom locker 63 to the container 6. Once the locking process is completed, an electrical current flowing from the Long Logistics Rod (LLR) 3 will be stored within the holder battery unit 66, which is managed by a Battery management system 67 connected with a microprocessor 68. Next, an electrical current flowing from the Long Logistics Rod (LLR) 3 will flow through the bottom locker 63 and further flow through the current transfer unit 64 and stored within the container battery unit 70, which is managed by another Battery management system 71. It's important to note that the control center 4 receives information exchange 72 between the control center 4, the microprocessor 61 in the container 6 and the microprocessor 68 in the holder 5.

Figure 13:
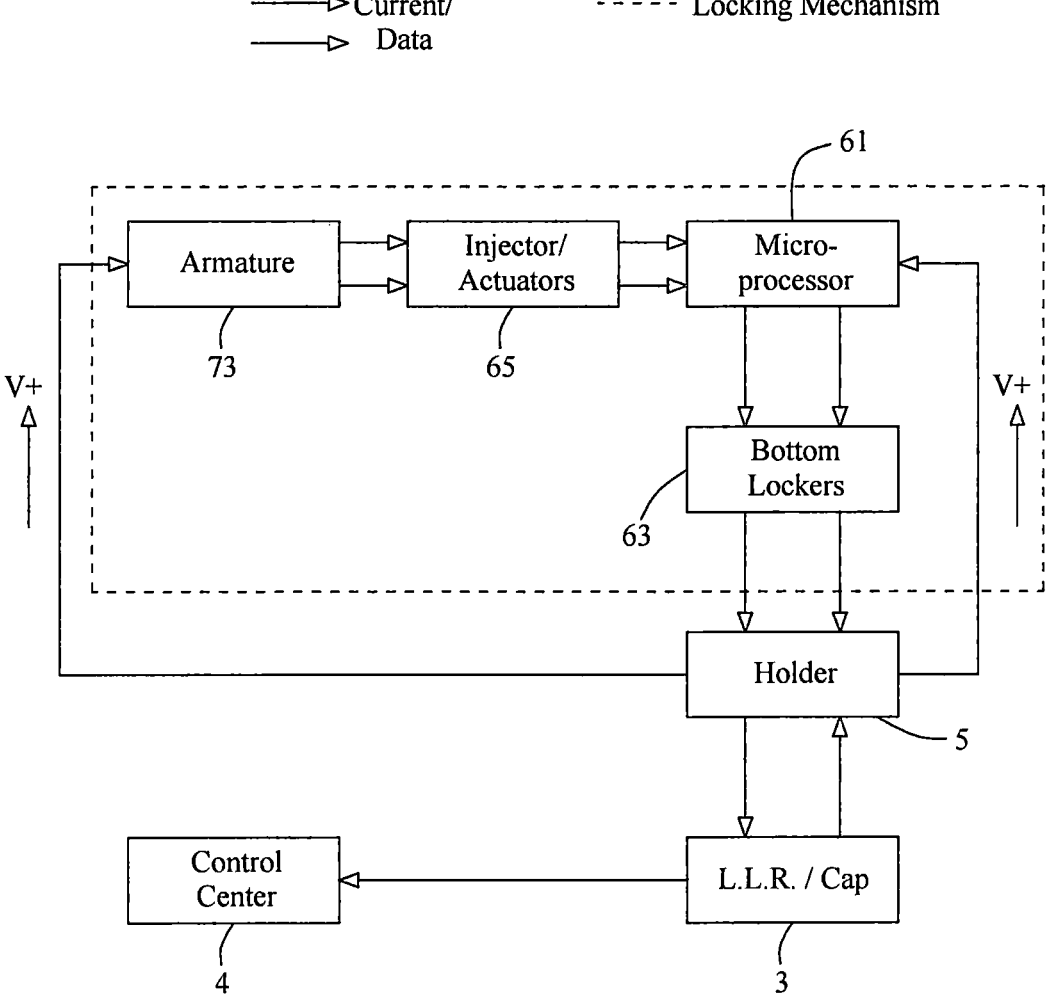
FIG. 13 illustrates a simplified locking process/alignment process, in accordance with the present invention.

FIG. 13 shows a simplified locking process/alignment process, as discussed above, the lower container section 8 of the container 6 includes a locking system. Further as discussed above, the holder 5 includes the laser assembly 34 comprising a semiconductor laser 61 that illuminates a coherent light beam shot to the gain ring 12 and photon sensor 13 of the outer layer of the lower container section 8. Once the coherent light beam is shot through the gain ring 12, the photon sensor 13 will send the readings to a microprocessor 61. Once these readings are read by the microprocessor 61, the control center 4 will receive the readings and finish the alignment process. When in a full alignment, the microprocessor 61 will initiate the bottom lockers 63 that secures the container 6 to the holder 5 and also transfers current from the Long Logistics Rod (LLR) 3 through the holder 5 to the container 6. Where a cylindrical casing which comprises two layers that is an inner layer and an outer layer, is connected to forms a "yoke" at the front of injectors/actuators 65 which will connect to an armature 73. Actuators/injectors 65 will push and pull vertically in the alignment process. The bottom lockers 63 will activate once the container 6 is aligned to the holder 5, thus locking the system and transferring current to the battery. It's important to note that once the container 6 and the holder 5 have fully mated, the system will thus cut off current running through the holder 5 and the container 6 unless the battery packs need to be charged. As described herein, a small magnetic field will need to be formed to ensure the armatures 73 connection to the injectors 65.

Figure 14:
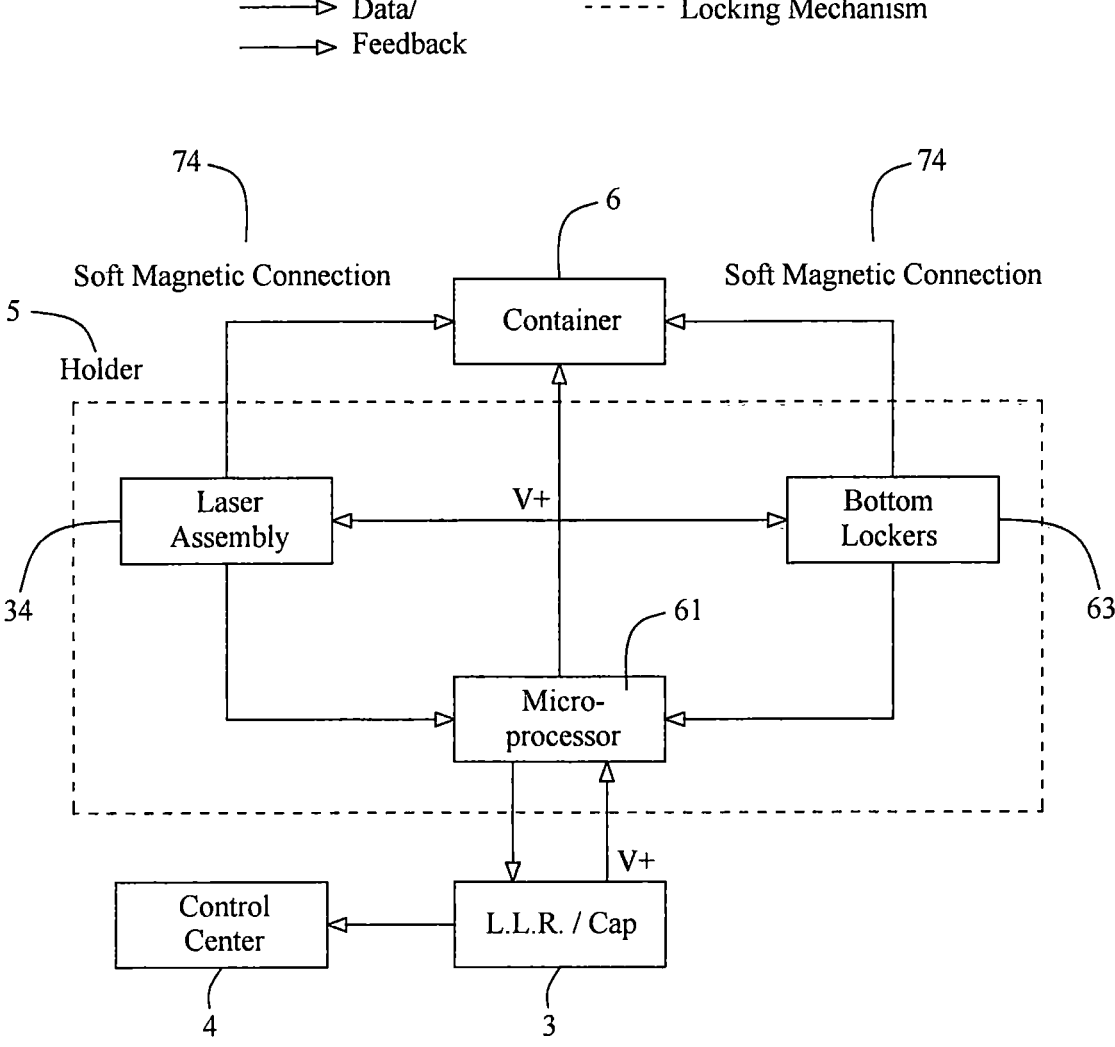
FIG. 14 is a block diagram of data and feedback systems for optimization of power consumption, as well as a soft magnetic connection in accordance with the present invention.

As shown in FIG. 14, it is understood that the holder 5 is an essential core, the holder 5 plays a pivotal role in ensuring full alignment of the container 6 to the holder 5, once alignment is achieved, laser assembly 34 which is part of the holder 5 will connect to the container's armature 73. The laser assembly 34 is intuitively easy to visualize, the laser assembly 34 may include a laser light source i.e. any laser coherent light beam, which will be pointed at a 0-degree angle at the photon sensor (photovoltaic sensor) 13. To ensure the locking, a soft magnetic connection 74 a measuring apparatus in the form of photovoltaic sensors is provided. The bottom lockers unit 63 will be in a similar configuration as that of the locking mechanism. Current flowing through the holder 5 will be stored in the battery pack of the container 6. While the electrical current flowing up from the Long Logistics Rod (LLR) 3 will be stored and transferred to the battery in the holder 5. It's also important to note that the data and feedback will be sent back to the control center 4 for optimization of power consumption and data feedback.

The bottom lockers 63 will connect to the container 6 only when the photon sensor (photovoltaic sensors) 13 all align with the perimeters set within the microprocessor 61. Once the locking process is complete current will flow through to the battery for charging.

According to the embodiments of the invention, the locking mechanism occurs between the container 6 with mid-section (the plate 32) of the holder 5 using lasers of the laser assembly 34 of the holder 5 by providing an alignment with bottom lockers 63. Further, the locker connection point 69 and the injectors/actuators 65 will have an injector or "arm". The arm will be moved at an angle depending on the needed angle. The arm will be built in copper. The inner copper will be for current transfer for data and battery charging. The yoke is the connecting point to the bottom lockers. The connection has to be of force and also transfers electrical current. Further in some embodiments, the armature 73 will also act as a pathway for current transfer. In some embodiments, the actuator 65 will also be pushed by a servo linear actuator which will have a push/pull configuration. It will also reduce retention on the armature 73 and also be used for redundancy.

Figure 15:
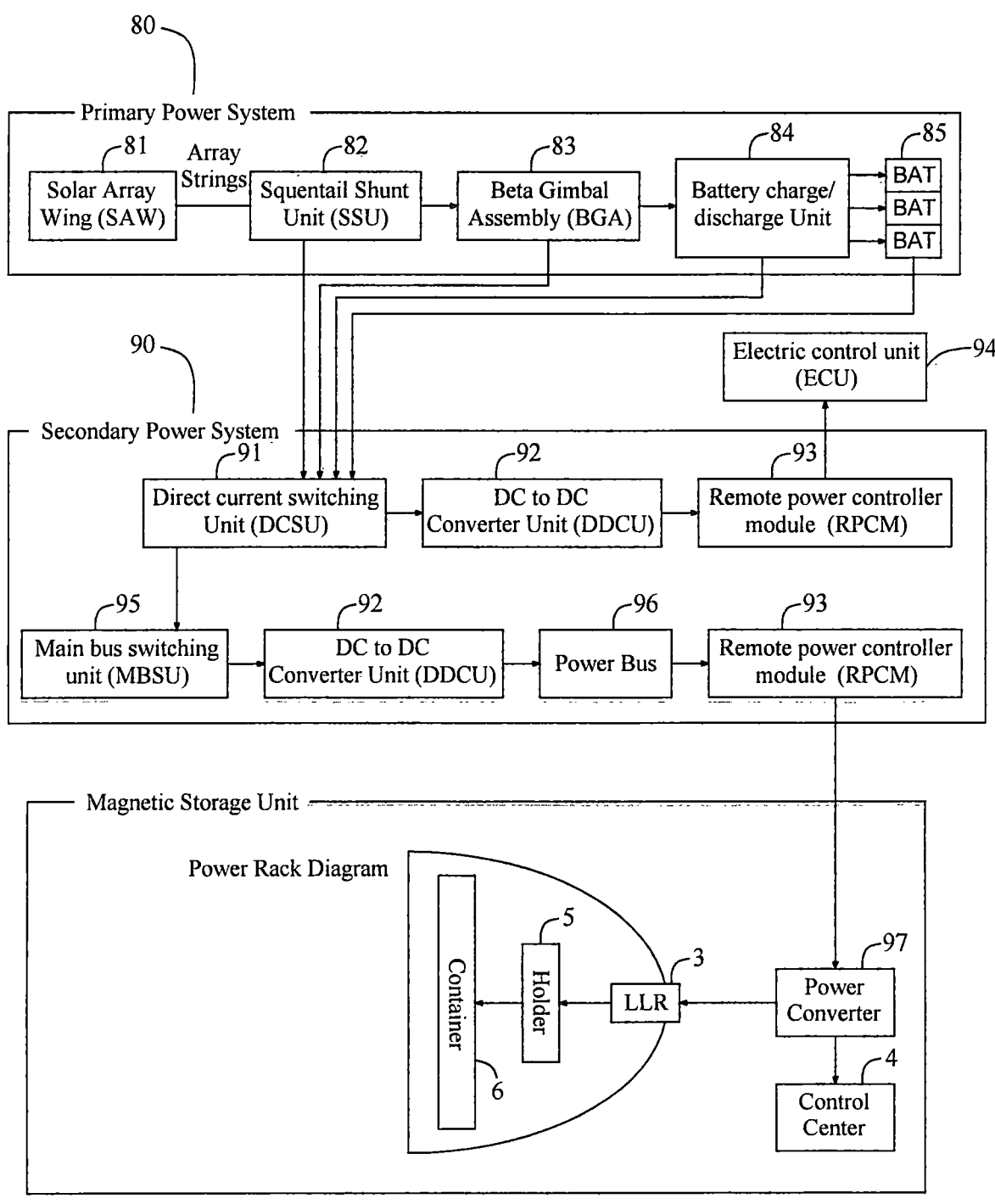
FIG. 15 shows an integration of the Magnetic Storage Unit (MSU) to an International Space Station (ISS) having a primary power system and a secondary power system, in accordance with the present invention.

FIG. 15 shows an integration of the Magnetic Storage Unit (MSU) to an International Space Station (ISS) having a primary power system 80 and a secondary power system 90. Where the primary power system 80 consists of a Solar Array Wing (SAW) 81 connected to a Sequential Shunt Unit (SSU) 82, which is further connected to a Beta Gimbal Assembly (BGA) 83, which is further connected to a battery charge/discharge unit 84, where a plurality of batteries 85 are connected. The secondary power system 90 consists of Direct Current Switching Unit (DCSU) 91 connected to the components of the primary power system 80. It's important to note that the secondary power system 90 has a D.C. to D.C Converter Unit (DDCU) 92 which then moves to a Remote Power Controller Module (RPCM) 93, where an Electronic Control Unit (ECU) 94 is connected. Where the Direct Current Switching Unit (DCSU) 91 is further connected to a Main Bus Switching Unit (MBSU) 95, where another D.C. to D.C converter unit (DDCU) 92 is present in connection with a power bus 96. The Power bus 96 is then connected to another Remote Power Controller Module (RPCM) 93, which then moves to a Power Converter 97. Current moves through the Long Logistics Rod (LLR) 3 into the holder 5 and Holder battery unit as well as the bottom lockers 63 and then transfers the current to the container 6 and container battery unit. It should be noted that further inverters are required within the Magnetic Storage Units (MSUs). As discussed herein, this integration further works on future space stations and spacecraft.

The foregoing description of embodiments of the invention has been presented for purposes of illustration and description. It is not intended to be exhaustive or to limit the invention to the precise form disclosed, and modifications and variations are possible in light of the above teachings or may be acquired from the practice of the invention. The embodiments were chosen and described in order to explain the principles of the invention and its practical application to enable one skilled in the art to utilize the invention in various embodiments and with various modifications as are suited to the particular use contemplated.

The invention claimed is:

1. An integration of a Magnetic Storage Unit (MSU) for a spacecraft, comprising:

at least one container;

at least one holder;

at least one Long Logistics Rod;

a power wall;

an external power source; and a control center, wherein the container comprises a storage compartment and a lower container section, the storage compartment provides a space for storing cargo, the lower container section is an upside-down isosceles trapezoid in shape forming outward edges of the lower container section, wherein the lower container section comprises a gain ring and photon sensors mounted at the outward edges of the upside-down isosceles trapezoid, wherein the holder comprises:

a middle plate joining two side plates, each side plate forming a right triangle, a laser assembly, where the laser assembly includes a semiconductor laser that illuminates a coherent light beam shot to the gain ring and the photon sensors at the outward edges of the lower container section for alignment between the lower container section and the holder, wherein the gain ring and the photon sensor sends readings to a microprocessor, the readings are received by the control center, and a bottom locker that moves vertically up to a locker connection point located at the bottom of the lower container section, injectors or actuators lock the bottom locker to the lower container section, wherein the Long Logistics Rod is a duct with at least one adapter for electrical integration with the holder, where the adaptor connects to a bottom of the holder, where the external power source transfers current/power to the power wall and the Long Logistics Rod, where the Long Logistics Rod is linked to the control center for human interaction with the container secured to the holder.

2. The Magnetic Storage Unit (MSU) of claim 1, wherein each right triangle on the holder contains servo linear actuators for vertical and horizontal movement to secure different sizes of the container.

3. The Magnetic Storage Unit (MSU) of claim 1, wherein the lower container section provides a locking mechanism/ locking system for securing the container to the holder.

4. The Magnetic Storage Unit (MSU) of claim 1, wherein the holder further carries an onboard holder battery pack for stored power to relieve pressure off the external power source.

5. The Magnetic Storage Unit (MSU) of claim 1, wherein the container further carries an onboard container battery pack for stored power to relieve pressure off the external power source.

6. The Magnetic Storage Unit (MSU) of claim 1, wherein the Long Logistics Rod further contains a harness for connecting to external power busses for supplying the current/power to the control center, the holder and the container.

7. The Magnetic Storage Unit (MSU) of claim 1, wherein the adaptor of the Long Logistics Rod includes an insulation cap for insulating the current/power flowing from the harness to the holder for safety purposes.

8. The Magnetic Storage Unit (MSU) of claim 1, wherein a lower section of the container is covered with a thin rubber layer and the laser assembly is placed at the outward edges for alignment between the lower container section and the holder.

9. The Magnetic Storage Unit (MSU) of claim 1, wherein after alignment of the container to the holder, the microprocessor detects information from the photon sensor and initiates the bottom locker, where the injectors or actuators lock the bottom locker to the container.

10. The Magnetic Storage Unit (MSU) of claim 1, wherein the power wall is configured to include one or more magnetic storage units by forming a plurality of individual racks, where racks are avionic racks.

* * * * *